(12) United States Patent
Kato

(10) Patent No.: US 8,439,436 B2
(45) Date of Patent: May 14, 2013

(54) ARRANGEMENT STRUCTURE FOR DUCT

(75) Inventor: Tomotake Kato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 323 days.

(21) Appl. No.: 12/905,679

(22) Filed: Oct. 15, 2010

(65) Prior Publication Data

US 2011/0089724 A1  Apr. 21, 2011

(30) Foreign Application Priority Data

Oct. 16, 2009  (JP) .................................. 2009-238961

(51) Int. Cl.
*A47C 7/72* (2006.01)
(52) U.S. Cl.
USPC ................................... 297/180.1; 297/378.13
(58) Field of Classification Search ............. 297/378.13, 297/180.1
See application file for complete search history.

(56) References Cited

U.S. PATENT DOCUMENTS

| | | | | |
|---|---|---|---|---|
| 4,572,569 | A * | 2/1986 | Haßmann | 296/65.17 |
| 6,811,199 | B2 * | 11/2004 | Nozaki | 296/63 |
| 7,625,039 | B2 * | 12/2009 | Mangiapane et al. | 296/208 |
| 2003/0186115 | A1 * | 10/2003 | Shibasawa et al. | 429/100 |
| 2007/0085368 | A1 * | 4/2007 | Hirokawa et al. | 296/65.16 |
| 2009/0256523 | A1 * | 10/2009 | Taguchi | 320/109 |

FOREIGN PATENT DOCUMENTS

| | | |
|---|---|---|
| JP | H04-069330 U | 6/1992 |
| JP | 2004-001683 | 1/2004 |
| JP | 2005-022506 A | 1/2005 |
| JP | 2009-154599 | 7/2009 |
| JP | 2009-184577 A | 8/2009 |

* cited by examiner

Primary Examiner — Sarah B McPartlin
(74) Attorney, Agent, or Firm — Rankin, Hill & Clark LLP

(57) ABSTRACT

An arrangement structure for a duct is provided, enabling formation of an air intake opening of the duct such as to be widely open on the side of a seatback and improvement in strength of a striker holding the seatback. The arrangement structure includes a vehicle seat with a seatback and a lock mechanism provided on the seatback and engaging with a striker supported on a vehicle sidewall to lock the seatback at a standing position; and the duct provided on the side of the seatback, extending in the up and down direction and flowing air. The striker has an inclined portion extending from the engaging position of the seatback and the lock mechanism toward outside with respect to a vehicle lateral direction and toward the vehicle rear side. The duct is disposed on the side of the seatback and on the front side of the inclined portion.

3 Claims, 6 Drawing Sheets

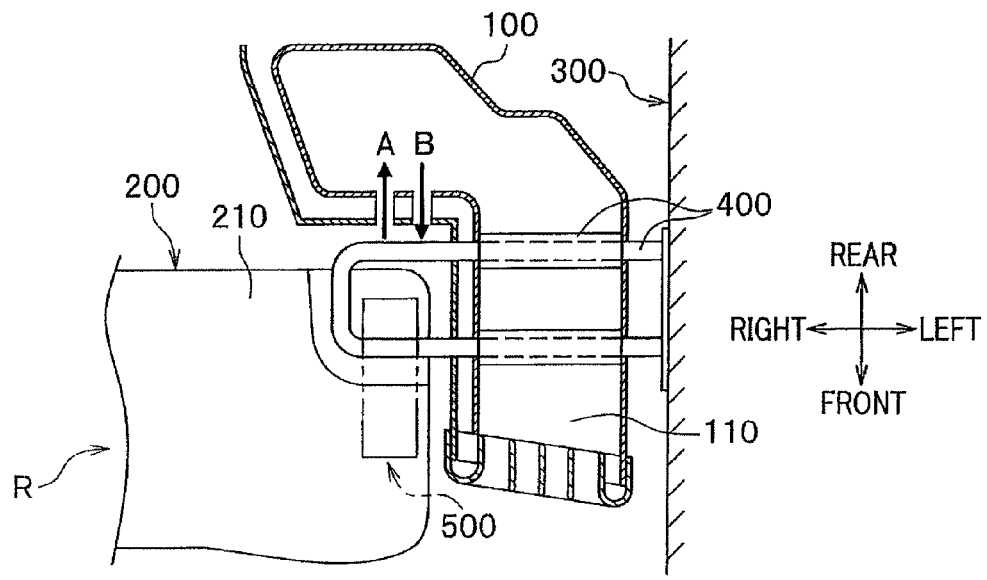
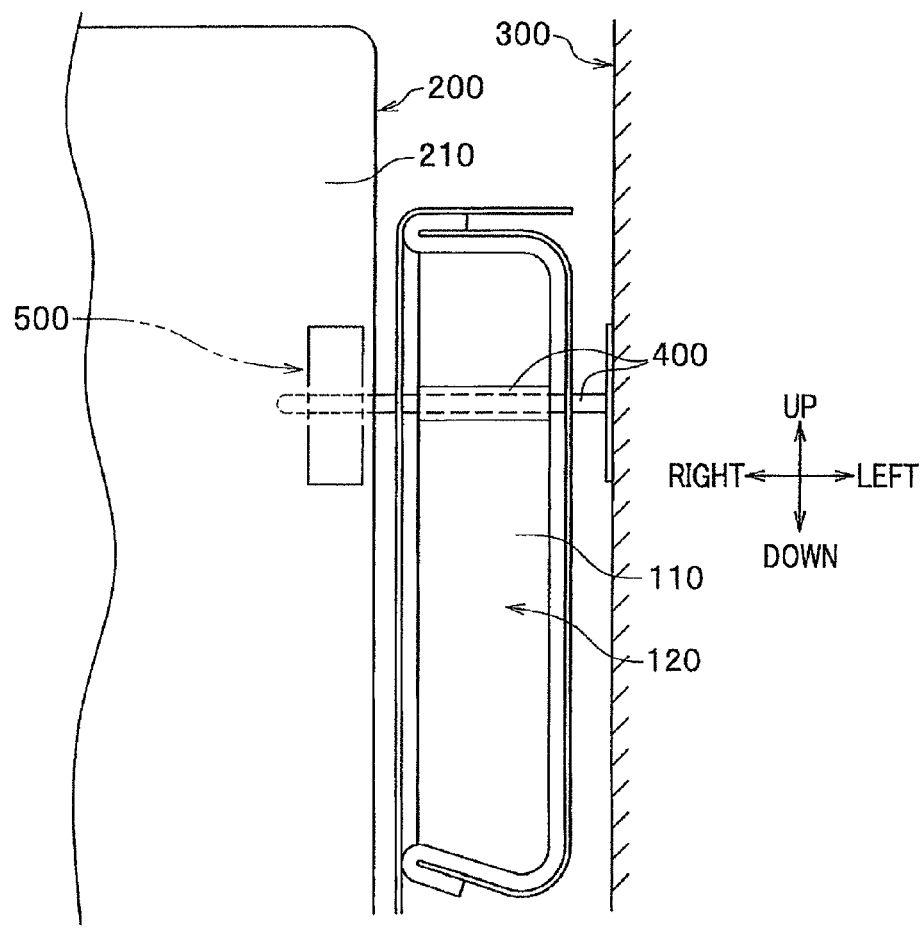

ARRANGEMENT STRUCTURE FOR DUCT

CROSS-REFERENCE TO RELATED APPLICATION

The present application claims priority under 35 USC 119 to Japanese Patent Application No. 2009-238961 filed on Oct. 16, 2009 the entire contents of which are hereby incorporated by reference.

BACKGROUND OF THE INVENTION

1. Field of the Invention

The present invention relates to an arrangement structure for a duct, in which, for example, an air intake opening is provided on a lateral portion of a seatback of a vehicle seat.

2. Description of the Related Art

Conventionally, a battery for supplying electric power to a driving source is mounted on an electric vehicle, a hybrid vehicle, or a fuel-cell vehicle. Such a battery generates heat during charging or discharging. Therefore, a vehicle having such a battery is designed to take in air in a vehicle room by an air supply fan and supply the air to the battery for cooling (for example, refer to JP 2004-001683 A (FIGS. 1, 2, and 5)).

In the cooling structure for a vehicle battery described in JP 2004-001683 A, an air intake opening of an air intake duct is provided with a tonneau cover to cool a battery mounted under the floor of a luggage space, in which air in the luggage space is flowed to the battery from the air intake opening through an air supply fan for cooling.

However, since the luggage space is disposed at the rear end portion of a vehicle, the air in the room of the luggage space is warmed by sunlight. Therefore, cooled air is hard to flow in. Thus, the temperature of the luggage space is higher than that of the air inside the passenger room.

As a solution of this problem, a cooling air intake structure, which has been devised to take in cooled air in the passenger room, is known and described in JP 2009-154599 A (FIGS. 1 to 5).

FIG. 5 shows an arrangement of the air intake opening of the duct of a conventional cooling air intake structure for a battery, and is a perspective view showing the arrangement of a main part without a fin filter or the like for preventing foreign matters from entering. FIG. 6 is an enlarged horizontal cross-sectional view showing an arrangement of a striker and a lock mechanism in the conventional cooling air intake structure for a battery. FIG. 7 shows the arrangement of the striker in the conventional cooling air intake structure for a battery, and is an enlarged cross-sectional view showing an arrangement without the fin filter or the like for preventing foreign matters from entering.

As shown in FIG. 5, in the cooling air intake structure for a battery described in JP 2004-001683 A, an air intake opening 110 of a duct 100 for taking in air for cooling a battery (not shown) is disposed between an upper lateral portion 210 of a rear seat 200 and a vehicle sidewall 300 (refer to FIGS. 6 and 7) to take in air from the side of the passenger room R into which air cooled by a cooling unit is discharged. In the upper lateral portion 210 of the rear seat 200, there is arranged a lock mechanism 500 for locking a striker 400 substantially in a U-shape which horizontally protrudes along a vehicle lateral direction from the vehicle sidewall 300 (refer to FIGS. 6 and 7).

However, in the cooling air intake structure described in JP 2004-001683 A, the striker 400 for fixing the upper lateral portion 210 of the rear seat 200 to the vehicle sidewall 300 is arranged at the position where the air intake opening 110 of the duct 100 is provided. Also, the striker 400 penetrates the upper portion of the air intake opening 110. Consequently, even if the air intake opening 110 of the duct 100 is formed long in the up and down direction, the obstruction caused by the striker 400 narrows the cross-section in the vicinity of the striker 400 in the duct 100, which reduces the air flow. This prohibits taking-in of a large amount of air. That is, with the conventional cooling air intake structure, the space in the vicinity of the upper lateral portion 210 of the rear seat 200 is restricted by the striker 400 and cannot be used. Consequently, there has been a problem that the air intake opening 110 may take in the air in the passenger room only from a lower portion 120 which is lower than the position of the striker 400.

Further, as shown in FIGS. 6 and 7, the striker 400 is arranged horizontally in a vehicle lateral direction with respect to the vehicle sidewall 300 extending in the vertical direction. Therefore, there has been a problem that the striker 400 has a structure which is easy to receive a load in the peeling-off direction (the forward and backward directions shown by the arrows A and B in FIG. 6) when the vehicle is rear-ended by a following vehicle, or the vehicle itself suddenly accelerates or stops.

SUMMARY OF THE INVENTION

The present invention has been made to solve the above problems, and an object thereof is to provide an arrangement structure for a duct to enable formation of an air intake opening of a duct such that the opening is widely open on the side of a seatback, and improvement in strength of a striker holding the seatback.

In order to solve the above problems, in a first aspect in accordance with the invention, an arrangement structure for a duct, includes: a vehicle seat having a seatback and a lock mechanism provided on the seatback and engaging with a striker supported by a vehicle sidewall to lock the seatback at a standing position; and a duct provided on a side of the seatback and extending in an up and down direction to flow air, in which the striker includes an inclined portion extending from an engaging position of the seatback for engaging with the lock mechanism toward outside with respect to a vehicle lateral direction and toward a vehicle rear side, and the duct is disposed on the side of the seatback and on the front side with respect to the inclined portion of the striker.

In this structure, the striker is provided with an inclined portion extending from the engaging position for engaging with the lock mechanism of the seatback toward outside with respect to the vehicle lateral direction and toward the rear side of the vehicle, and thereby the striker can be disposed in an inclined direction with respect to the front and rear direction of the vehicle. Thus, the striker is improved in the strength against a load in the forward or backward direction of the vehicle, and can receive a heavy load even when the load in the forward or backward direction is applied to the seatback of the rear seat. In such a manner, the striker is prohibited from being deformed or peeled off from the vehicle sidewall by the load received from the seatback.

Further, since the duct is disposed laterally to the seatback and on the front side with respect to the inclined portion of the striker, the striker does not interfere with air flow, and the space on the upper lateral side of the seatback (the space in the direction from the air intake opening to the deeper side) is freely usable. Thus, the air intake opening of the duct can be disposed in the entire space between the upper lateral side of the seatback and the vehicle sidewall, which enables the air intake opening and the inlet portion to be formed largely so that air flows smoothly. As a result, it is possible to easily take in a large amount of air from the passenger room and improve the air absorption capacity of the duct.

In a second aspect in accordance with the invention, in the arrangement structure for a duct of the first aspect, a support surface facing toward a vehicle front side is provided on the vehicle wall, and the support surface is provided with a support pedestal to support the inclined portion.

In this structure, the support surface, which faces toward the front side of the vehicle and is provided on the vehicle wall, is provided with the support pedestal to support the inclined portion of the striker, and thereby a load applied to the striker in the direction from the front side to the rear side of the vehicle can be firmly received by the pedestal. Accordingly, even when a heavy load is applied to the striker in the forward or backward direction of the vehicle, the striker is prohibited from being peeled off from the vehicle sidewall or from being bent by the load, and thus the fixing strength of the striker is improved.

In a third aspect in accordance with the invention, in the arrangement structure for a duct of the first or second aspect, the air intake opening is provided to communicate with the duct to take in air from a vehicle room, and provided between a lateral portion of the seatback and the vehicle sidewall from an upper side to a lower side with respect to the engaging position of the striker.

In this structure, the air intake opening is provided from the upper side to the lower side with respect to the engaging position of the striker, and thereby, the air intake opening can be formed largely, which enables a large amount of air to be taken in. As a result, for example, the cooling capacity of cooling a medium to be cooled, such as a battery, is improved by the air, and the medium to be cooled can be efficiently cooled.

BRIEF DESCRIPTION OF THE DRAWINGS

FIG. 6 is an enlarged horizontal cross-sectional view showing an arrangement of a striker and a lock mechanism in the conventional cooling air intake structure for a battery; and FIG. 7 is an enlarged horizontal cross-sectional view showing an arrangement without the fin filter and the like for preventing foreign matters from entering, showing the arrangement of the striker in the conventional cooling air intake structure for a battery.

DETAILED DESCRIPTION OF THE PREFERRED EMBODIMENT

First, an arrangement structure for a duct in accordance with an embodiment of the invention will be described with reference to FIGS. 1 to 4. For convenience sake in the following description, the forward direction of a vehicle will be referred to as the front, the backward direction of the vehicle as the rear, and the vehicle lateral direction as the left/right. Prior to the description of a duct 1 in accordance with the invention, a vehicle on which the duct 1 is mounted and a battery 7 to which air is flowed by the duct 1 will be described below.

Structure of Vehicle

Figure 1:
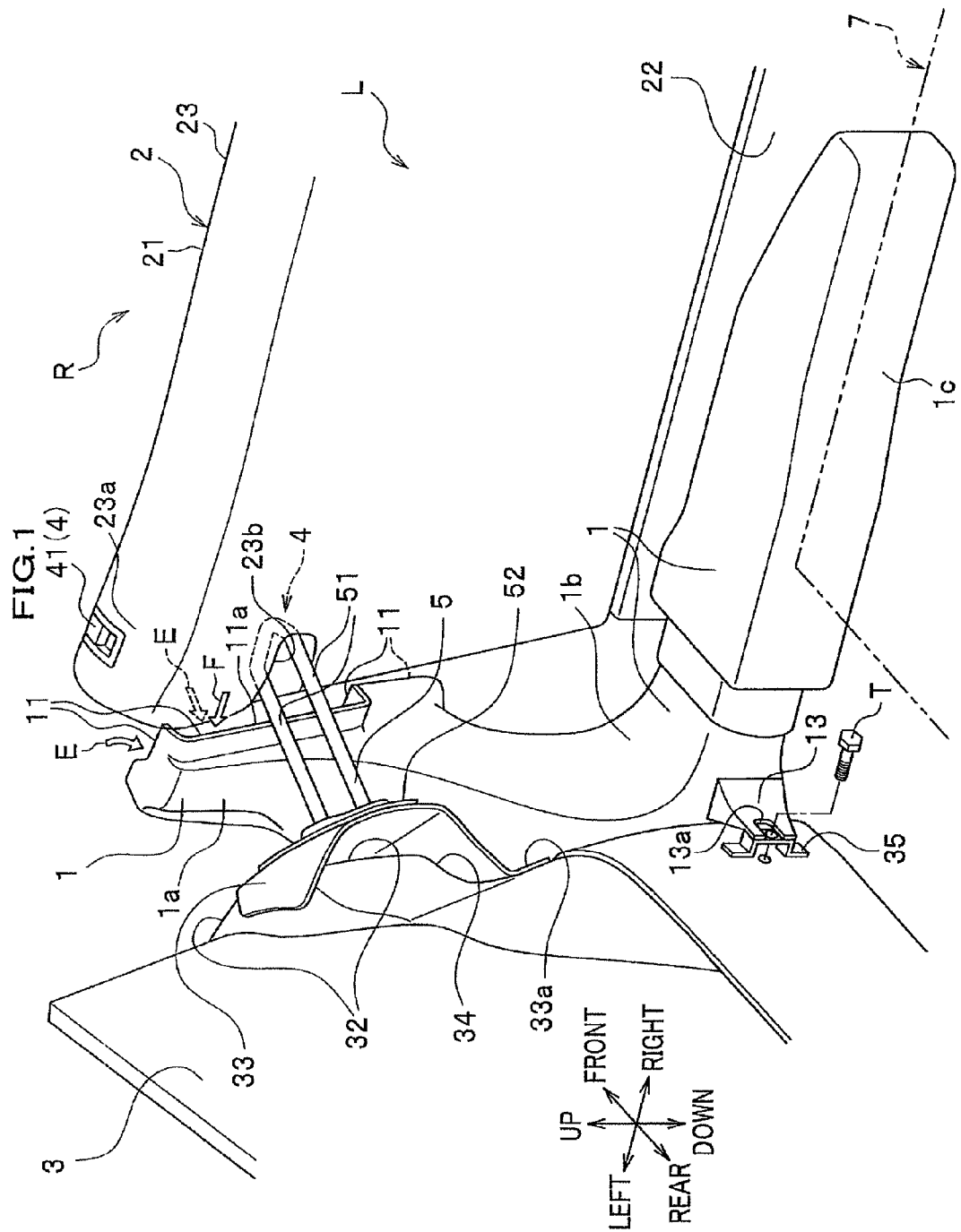
FIG. 1 is a perspective view of an arrangement of the duct and a striker viewed from the rear side, showing an example of an arrangement structure for a duct in accordance with an embodiment of the invention.

The vehicle on which the duct 1 is mounted is, for example, an electric vehicle, a hybrid vehicle, or a fuel-cell vehicle. As shown in FIG. 1, on the vehicle, there are mounted the duct 1, the battery 7 for supplying electric power to a driving source, and a vehicle seat 2 on which passengers sit down. The vehicle may be one that has the duct 1, the battery 7, and the vehicle seat 2 mounted thereon, and the model or the type of the vehicle is not particularly limited. Hereinafter, an example of a vehicle having a rear seat 21 as the vehicle seat 2 will be described.

The vehicle has a passenger room R, in which passengers ride, on the front side with respect to the rear seat 21, and a luggage space L (a cargo room), which is a space for mounting luggage and the like, on the rear side with respect to the rear seat 21.

Structure of Passenger Room and Luggage Space

In the passenger room R, there are arranged, for example, front seats (not shown), namely the driver seat and the front passenger seat, the rear seat 21, an instrument panel (not shown), and the like. Air, such as cool air cooled by an air conditioner, is discharged into the passenger room R from a discharge opening (not shown) provided on the instrument panel toward the rear seat 21 on the rear side of the vehicle.

In the luggage space L (also referred to as a luggage room), there are provided a floor on which luggage or the like is mounted, the battery 7 mounted under the floor, the duct 1 for supplying the air of the passenger room R to the battery 7, vehicle walls 3 arranged on each of the left and right sides of the luggage space L, and a backdoor (not shown) arranged openably and closably on the rear side of the luggage space L.

Structure of Vehicle Sidewalls

As shown in FIG. 1, the vehicle sidewalls 3 are vertical inner walls provided on the left and right sides of the luggage space L. Each vehicle sidewall 3 is provided with a trunk side lining 31 (refer to FIG. 2) covering the vehicle sidewall 3 and the like, a support surface 32 formed on the vehicle sidewall 3, which faces in an inclined direction toward the inner front of the vehicle, a support pedestal 33 supporting an inclined portion 51 on the support surface 32 through a fitting seat portion 52, a reinforcing plate 34 reinforcing the support surface 32, and a retractor (not shown), for a seat belt, built in the vehicle sidewall 3. The vehicle sidewall 3 is formed, for example, by pressing a steel plate and is fixed to a vehicle frame (not shown). On the front end portion of the vehicle sidewall 3, a rear side door (not shown) is provided along the vehicle sidewall 3 openably and closably, and the rear seat 21 is provided at the front end portion in the direction toward the passenger room R inner side, with the duct 1 (the space for arranging the duct 1) between the vehicle sidewall 3 and the rear seat 21.

Structure of Trunk Side Lining

Figure 2:
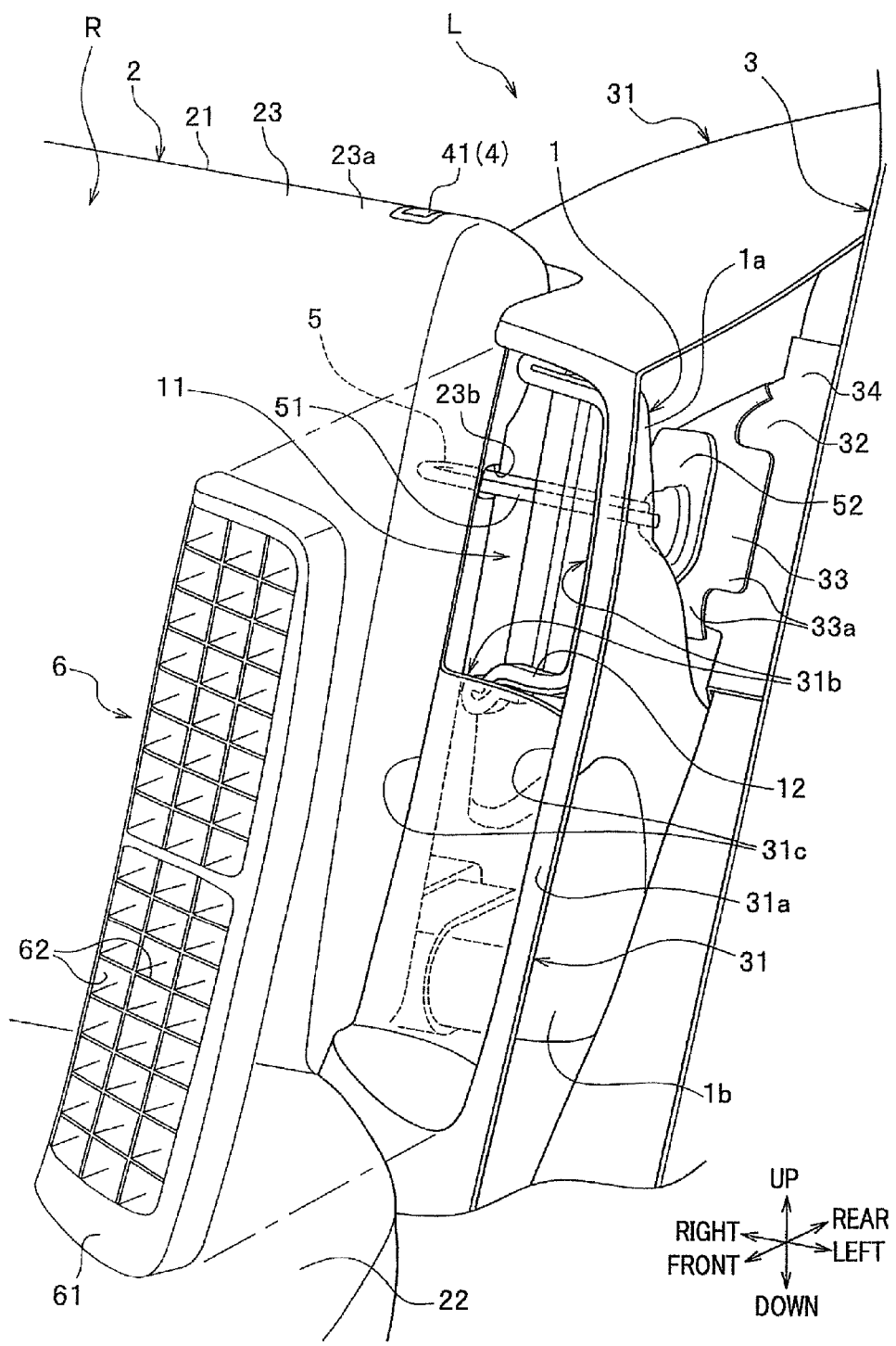
FIG. 2 is an enlarged and exploded perspective view showing the arrangement of the duct and the striker viewed from the front side, showing the example of the arrangement structure for a duct in accordance with the embodiment of the invention.

As shown in FIG. 2, the trunk side lining 31 is an interior member for forming the inner wall of the luggage space L. The trunk side lining 31 covers the vehicle sidewall 3, the support pedestal 33, the reinforcing plate 34, the duct 1, a frame member 12, and the like. A front face portion 31a of the trunk side lining 31 is formed with an opening portion 31b which is formed to match an air intake opening 11; and with an engaging portion 31c to which the fin filter 6 is attached.

Structure of Support Surface

The support surface 32 supports a striker 5 on the vehicle sidewall 3 through the support pedestal 33. The support surface 32 is formed substantially in a convex shape by expanding the front end portion of the vehicle sidewall 3 toward the passenger room R, and is formed so that the striker 5 can be easily installed in the inclined direction with respect to the vehicle toward the inner front.

Structure of Support Pedestal

The support pedestal 33 is made of a metallic plate member provided such as to cover the support surface 32, and formed such as to expand in a convex shape facing the inclined direction toward the inner front. The central portion of the support pedestal 33 is formed to be a flat face perpendicular to the inclined direction with respect to the vehicle toward the inner front, and the fitting seat portion 52 of the striker 5 is fixed to the flat face of the support pedestal 33 by means of welding or the like. The peripheral portion of the support pedestal 33 is provided with a plurality of fixing pieces 33a protruding toward the outer peripheral direction to fix the support pedestal 33 to the reinforcing plate 34 by means of welding or means of fastening.

Structure of Reinforcing Plate

The reinforcing plate 34 is a member for improving the strength of the support surface 32 so that the support surface 32 is not deformed when a heavy load is applied from the seatback 23 to the striker 5. The reinforcing plate 34 is made of a metallic plate member and fixed to the vehicle sidewall 3 by means of welding or the like.

Structure of Battery

The battery 7 is an accumulator that generates heat during charging and discharging, and is disposed under the floor of the luggage space L, as shown in FIG. 1. The battery 7 uses the absorption force of an air supply fan (not shown) to take in air in the passenger room R from the air intake opening 11 of the duct 1, and apply the air to the battery 7, thereby performing heat exchange to cool the heat generated during charging/discharging. The air used to cool the battery 7 is exhausted to the atmosphere by an exhaustion duct (not shown).

Structure of Vehicle Seat

The vehicle seat 2 is, for example, a rear seat 21, and is a seat of a bench seat type which is formed in one body for the seat on the left side and the seat on the right side. The vehicle seat 2 is provided with a seat cushion 22, the seatback 23, a tilting device (not shown) for tilting the seatback 23 with respect to the seat cushion 22, and a pair of lock mechanisms 4 for fixing the seatback 23 to the left and right vehicle sidewalls 3. Further, adjacent to at least one of left and right upper lateral portions 23a of the seatback 23 of the vehicle seat 2, the air intake opening 11 of the duct 1 is arranged.

The vehicle seat 2 is, for example, a front seat when mounted on a vehicle with a single row seat, a rear seat when mounted on a vehicle with double row seats, or a seat disposed on the most rear side when mounted on a vehicle with triple row seats or more. Hereinafter, an example of a rear seat 21 in a case where double row seats are mounted on the vehicle as the vehicle seat 2 will be described. Incidentally, the vehicle seat 2 may be a separate type seat with separated seats on the left side and on the right side, and the type of the vehicle is not particularly limited.

Structure of Seat Cushion

As shown in FIG. 2, the seat cushion 22 is a part having the buttocks of passengers mounted thereon to hold the buttocks, and is movable in the forward and backward direction. The seat cushion 22 may be movable in the forward and backward direction or the like with respect to the vehicle body through a slide mechanism (not shown), or may be fixed to the vehicle body.

Structure of Seatback

Figure 3:
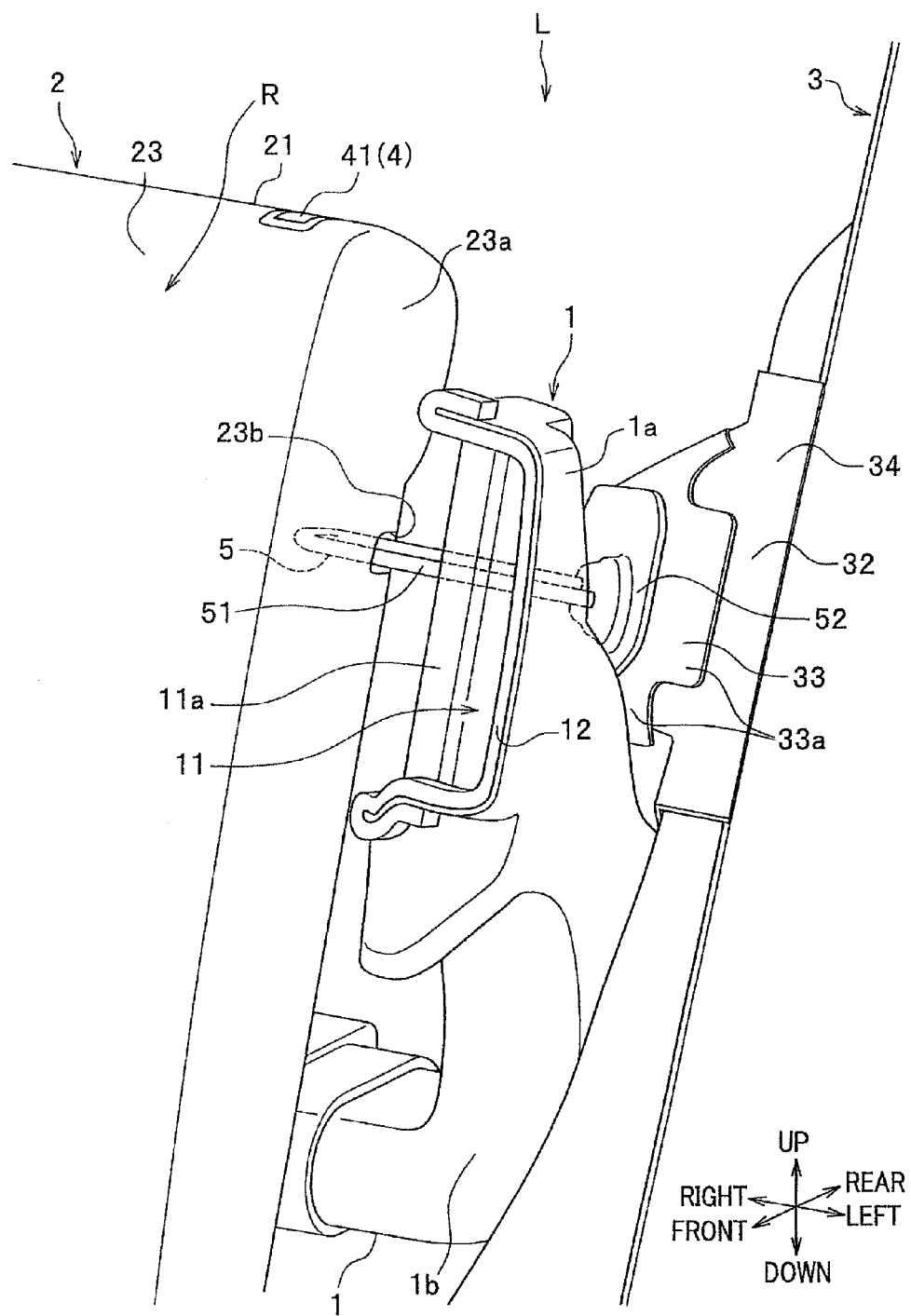
FIG. 3 is an enlarged perspective view showing the arrangement of the duct and the striker without a trunk side lining and a fin filter viewed from the front side, showing the example of the arrangement structure for a duct in accordance with the embodiment of the invention.

As shown in FIGS. 2 and 3, the seatback 23 is a back supporting the backs of passengers, and is coupled with the seat cushion 22 by a tilting mechanism (not shown) that supports the seatback 23 so as to be tiltable. Each of the left and right upper lateral portions 23a of the seatback 23 is provided with the lock mechanism 4 and a releasing knob 41 for releasing the striker 5 locked by the lock mechanism 4.

Structure of Lock Mechanism

Figure 4:
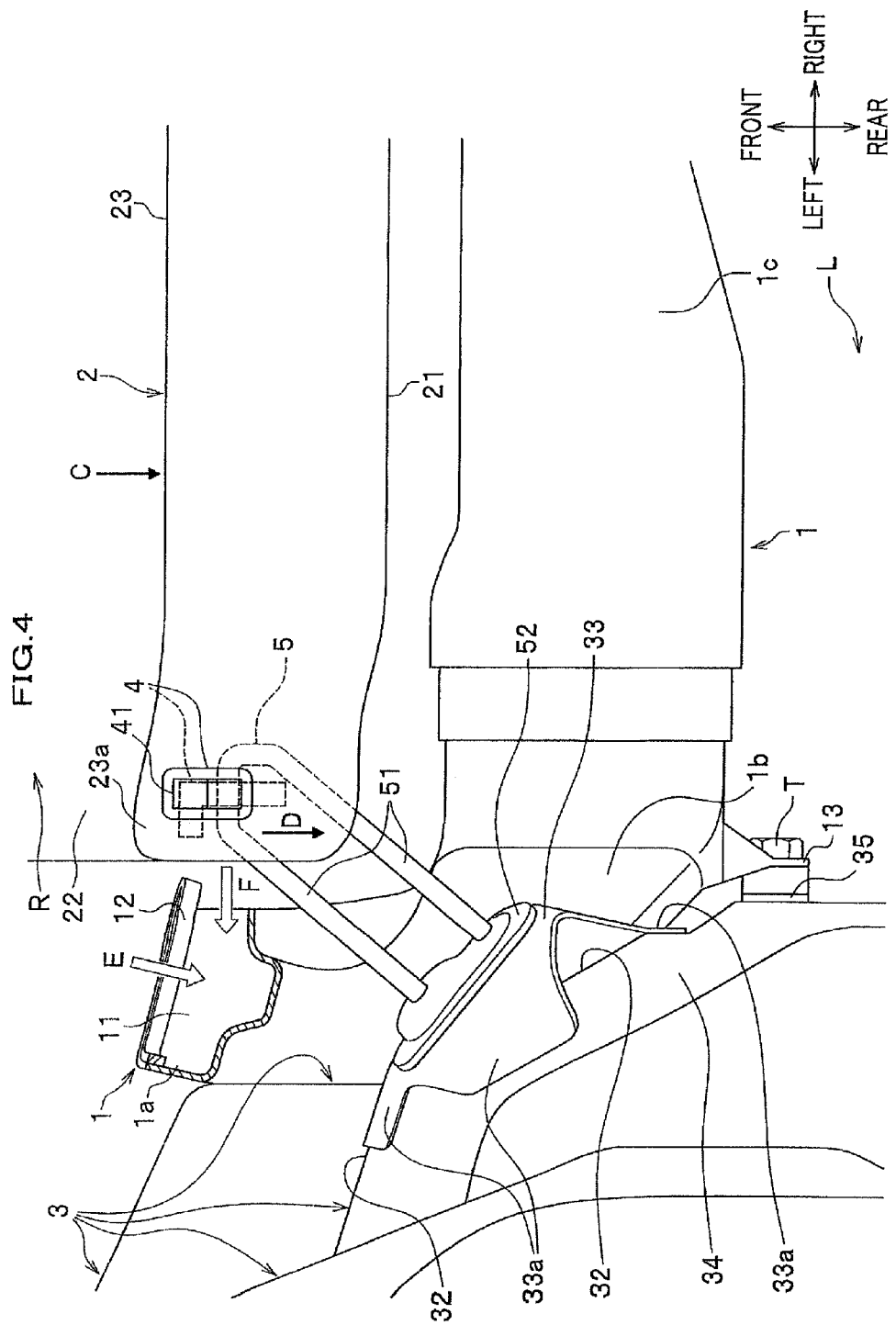
FIG. 4 is an enlarged plain view showing the arrangement of the duct and the striker, showing the example of the arrangement structure for a duct in accordance with the embodiment of the invention.
Figure 5:
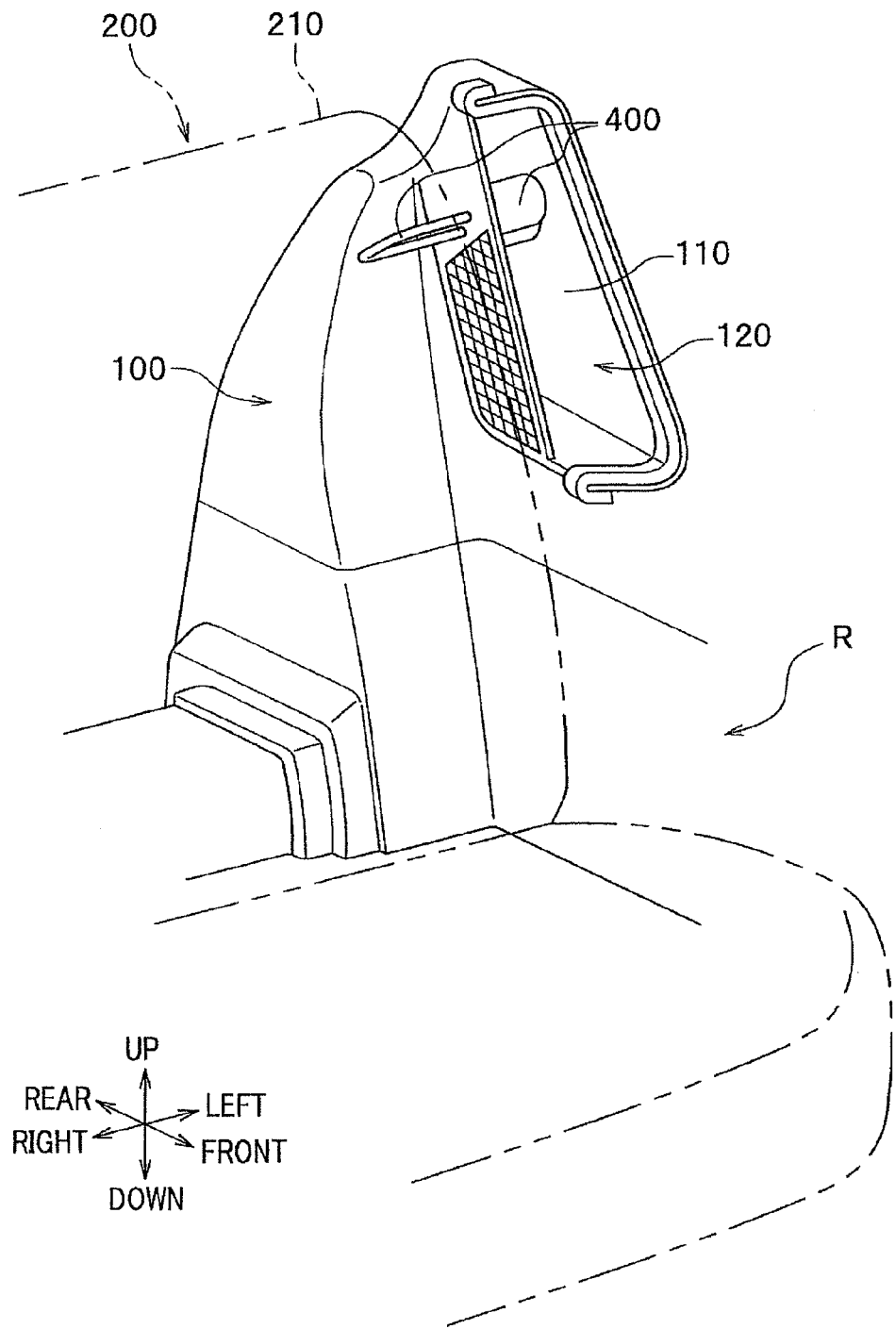
FIG. 5 is a perspective view showing an arrangement of a main part without a fin filter and the like for preventing foreign matters from entering, showing an arrangement of an air intake opening of a duct in a conventional cooling air intake structure for a battery.

As shown in FIG. 4, the lock mechanism 4 is a holding device that engages with the striker 5 supported by the vehicle sidewall 3 to lock the seatback 23 at a standing position. The lock mechanism 4 is automatically locked by insertion of the striker 5 into a striker insertion hole 23b (refer to FIGS. 2 and 3), and is released from the lock by pulling-up operation of the releasing knob 41 to make the seatback 23 tiltable.

The releasing knob 41 includes an operation lever of an automatic returning type so that the releasing knob 41 is pulled up to unlock the lock mechanism 4, and is released from a hand to return the lock mechanism 4 back to the lock.

Structure of Striker

As shown in FIGS. 1 and 4, the striker 5 is made by forming a metallic round bar member substantially into a U-shape having the inclined portion 51 extending from the position of engaging the striker 5 with the lock mechanism 4 on the seatback 23 toward the outer side with respect to the vehicle lateral direction and the vehicle rear side. The fitting seat portion 52 provided at the base end portion of the striker 5 is fixed to the support pedestal 33, and thus the striker 5 is fixed projecting from the vehicle sidewall 3 in the inclined direction toward the front. In such a manner, the striker 5 is installed without intersecting with the duct 1 or with the air intake opening 11.

The inclined portion 51 is a part formed facing the inclined direction toward the front with respect to the vehicle sidewall 3 (in other words, with respect to the front and rear direction of the vehicle). The inclined portion 51 has linear portions on one end side and the other end side of the striker being bent in the U-shape, and is formed horizontally in a side view (refer to FIGS. 2 and 3) and formed substantially in a parallelogram shape in a plain view (refer to FIG. 4).

The fitting seat portion 52 is made of a metallic plate member fixing the base end portion of the striker 5, and is firmly fixed to the support pedestal 33 by means of welding or the like.

Structure of Duct

As shown in FIGS. 1 and 4, the duct 1 is an air intake conduit for absorbing air in the passenger room R from the air intake opening 11 and supplying the air to the battery 7 as a cooling medium for the battery 7, and is formed, for example, of a synthetic resin material. The duct 1 is principally formed of an inlet portion 1a formed on the side of the upper lateral portion 23a of the seatback 23 and opening toward the front of the vehicle, an intermediate portion 1b bent substantially in an L-shape, and an outlet portion 1c provided at the outer peripheral portion of the battery 7 and formed with an discharge opening for discharging air to the outer peripheral portion of the battery 7.

As shown in FIGS. 1 and 3, the inlet portion 1a on the one end side of the duct 1 is provided such as to go, when viewed from the back (in front view), from the air intake opening 11, which is located at the upper lateral portion of the seatback 23, go under the striker 5 to avoid the striker 5, and extend in the lower and backward direction.

As shown in FIG. 4, the inlet portion 1a is disposed between the vehicle sidewall 3 and the lateral side of the seatback 23 with a gap on the side of the seatback 23, and extends from under the inclined portion 51 and the fitting seat portion 52 of the striker 5 toward the vehicle front side with respect to the inclined portion 51 and the fitting seat portion 52.

The intermediate portion 1b of the duct 1 is formed, in a plain view, such as to go from under the striker 5 at the left lateral portion of the seatback 23, and bends in an L-shape along the back of the seatback 23. At the rear side of the intermediate portion 1b, bracket portions 13 are integrally formed so as to fix the duct 1 to fixing members 35 fitted on the vehicle sidewall 3 with a fastening member T.

As shown in FIG. 1, the outlet portion 1c on the other end side of the duct 1 is arranged on the floor of the luggage space L at the rear end of the seat cushion 22 horizontally from the left end to the middle portion of the luggage space L.

Structure of Air Intake Opening

As shown in FIG. 1, the air intake opening 11 is formed having a long opening in the up and down direction downward from above the engaging position where the striker 5 is locked by the lock mechanism 4. Further, the air intake opening 11 is formed with a cutout portion 11a on the side of the seatback 23 so that air can be taken in also in the direction from the inner side of the passenger room R (the direction shown by arrow F). As shown in FIG. 3, the air intake opening 11 has an inner margin on the vehicle outer side. At the inner margin, the frame member 12 substantially in a sharp C-shape is fitted to reinforce the inner half of the air intake opening 11.

As shown in FIG. 4, the front face of the opening end of the air intake opening 11, the fin filter 6 disposed in front of the air intake opening 11, and the front face portion 31a (refer to FIG. 2) of the trunk side lining 31, are provided with inclination such as to face the inner side of the passenger room R with respect to the direction to the vehicle front.

Structure of Bracket Portions

The bracket portions 13 are parts for fixing the duct 1 to the vehicle sidewall 3 or under the floor, and are integrally formed at plural portions of the duct 1 (partially not shown). Each bracket portion 13 is a projecting piece projecting from the outer peripheral surface of the duct 1, and is formed with a U-shaped groove 13a or an insertion hole for inserting the fastening member T such as a bolt.

Structure of Fin Filter

As shown in FIG. 2, the fin filter 6 is a member for preventing foreign matters from entering from the air intake opening 11 into the duct 1, and the fin filter 6 is formed from a resin material integrating a frame portion 61 and a fin 62. The frame portion 61 is formed long in the up and down direction substantially in a rectangular shape. The fin 62 is formed in a grid form inside the frame portion 61.

Operation

Now, the operation of the arrangement structure for the duct 1 in accordance with the embodiment of the invention will be described with reference to FIGS. 1 to 4.

As shown in FIG. 4, for example, when the vehicle is rear-ended by a following vehicle and a force pressing passengers in the backward direction (the direction shown by arrow C) against the seatback 23 is applied, or when the vehicle starts suddenly and the inertial force of the passengers is applied to the seatback 23 as a force pressing it in the backward direction (the direction shown by arrow C), the striker 5 is applied with a pressing force in the backward direction (the direction shown by arrow D) through the seatback 23.

The striker 5 projects from the support surface 32 in an inclined direction toward the inside of the passenger room R, in which the support surface 32 is formed on the vehicle side wall 3 arranged on the outer side of the vehicle lateral direction of the seatback 23, and the support surface 32 is formed with inclination with respect to the vehicle body. In such a manner, the striker 5 is fixed with inclination with respect to the vehicle body. Therefore, the strength of the striker 5 is improved against a load in the vehicle forward or backward direction to be able to receive a heavy load applied in the forward or backward direction to the seatback 23 of the rear sheet 21.

On the support surface 32 of the vehicle sidewall 3, the support pedestal 33 holding the fitting seat portion 52 at the base end portion of the striker 5, and the reinforcing plate 34 reinforcing the support surface 32, are provided. Therefore, a load applied to the striker 5 in the vehicle forward direction (the direction shown by arrow D) can be firmly received by the support pedestal 33. Accordingly, even when a heavy load in the vehicle forward or backward direction (the direction shown by arrow D) is applied to the striker 5, the striker 5 is prohibited from being peeled off from the vehicle sidewall 3 or from being bent by the load, and thus the fixing strength of the striker 5 is improved.

The striker 5 is arranged with inclination in the vehicle front direction with respect to the vehicle sidewall 3, and the air intake opening 11 of the duct 1 is disposed on the side of the left side of the seatback 23 and on the front side with respect to the inclined portion 51 and the fitting seat portion 52 of the striker 5. Accordingly, the space on the upper left side of the seatback 23 is free from an obstructive striker 400 (refer to FIGS. 6 and 7) in the depth direction of a duct 100 (refer to FIG. 6) as in a conventional case, and thus the space can be freely used. Therefore, the air intake opening 11 of the duct 1 can be disposed in the entire space between the upper left side of the seatback 23 and the vehicle sidewall 3. As a result, the large intake area of the air intake opening 11 can be formed for smooth air flow to enable a large amount of air to be taken in from the front side of the vehicle room and the air absorption capacity of the duct 1 to be improved.

Further, as shown in FIG. 1, the inlet portion 1a and the air intake opening 11 of the duct 1 are disposed such as to avoid the striker 5. Thus, the air intake opening 11 can be formed long in the up and down direction, extending from an upper position above the engaging position where the striker 5 is locked by the lock mechanism 4, to a lower position. Further, a large cross-sectional area of the inlet portion 1a of the duct 1 can be formed. Still further, as the air intake opening 11 has a cut-out portion 11a on the side surface facing the inner side of the passenger room R, it is possible to take in air from two directions, namely in the front direction of the passenger room R (the direction shown by arrow E) and in the inner direction with respect to the vehicle lateral direction (the direction shown by arrow F).

As a result, since the air intake opening 11 can be formed largely to enable a large amount of cooled air discharged from an air conditioner (not shown) to be taken in, the battery 7 can be efficiently cooled with an improved cooling capacity and cooling efficiency for cooling the battery 7.

MODIFIED EMBODIMENTS

The invention is not limited to the embodiment described above, and various modifications and changes can be made without departing from the spirit of the invention, and it is needless to say that the invention covers these modifications and changes.

In the embodiment described above, an example has been described in which the air intake opening 11 of the duct 1 is provided at the upper lateral portion 23a on the left side of the seatback 23 of the rear sheet 21, however, the invention is not limited to this. As long as the air intake opening 11 of the duct 1 is disposed on a side of the vehicle seat 2, the air intake opening 11 may be provided on the right side or on both sides.

Further, although, in the embodiment described above, a case of cooling the battery 7 using the duct 1 has been described, the invention is not limited to this. A duct 1 in accordance with the invention is applicable as long as the duct 1 cools a medium to be cooled which is mounted on a vehicle and generates heat, and the duct 1 can be, for example, one that cools a power source such as a motor or an engine, or an electrical device.

What is claimed is:

1. An arrangement structure for a duct, comprising:
    a vehicle seat having a seatback and a lock mechanism provided on the seatback, said lock mechanism being adapted to engage a striker supported by a vehicle sidewall to lock the seatback at a standing position; and
    a duct provided on a side of the seatback and extending in an up and down direction to flow air, said duct including an air intake opening that is disposed in a space between said seatback side and said vehicle sidewall, said intake opening facing forwardly toward a front of said vehicle;
    wherein the striker includes an inclined portion extending from an engaging position of the seatback for engaging with the lock mechanism laterally toward an outside with respect to a vehicle lateral direction and rearwardly toward a vehicle rear side, and
    wherein the duct is disposed on the side of the seatback and forwardly relative to the inclined portion of the striker.

2. The arrangement structure for a duct according to claim 1, wherein a support surface that faces toward a vehicle front side is provided on the vehicle sidewall, and the support surface is provided with a support pedestal to support the inclined portion of the striker.

3. The arrangement structure for a duct according to claim 1, wherein the air intake opening is provided to communicate with the duct to take in air from a vehicle room, said air intake opening being provided between a lateral portion of the seatback and the vehicle sidewall from an upper side to a lower side with respect to the engaging position of the striker.

* * * * *